United States Patent
Weigmann et al.

(10) Patent No.: US 9,224,019 B2
(45) Date of Patent: Dec. 29, 2015

(54) ELECTROMAGNETIC INTERFERENCE DEVICE IDENTIFICATION SYSTEM AND METHOD

(71) Applicant: Alcatel-Lucent, Paris (FR)

(72) Inventors: Walter Weigmann, Fürth (DE); Wolfgang Templ, Sersheim (DE)

(73) Assignee: Alcatel Lucent, Boulogne-Billancourt (FR)

( * ) Notice: Subject to any disclaimer, the term of this patent is extended or adjusted under 35 U.S.C. 154(b) by 523 days.

(21) Appl. No.: 13/628,985

(22) Filed: Sep. 27, 2012

(65) Prior Publication Data

US 2014/0084133 A1    Mar. 27, 2014

(51) Int. Cl.
*G06K 7/10* (2006.01)
*G06K 19/067* (2006.01)
*H04K 1/00* (2006.01)
*G01S 7/02* (2006.01)

(52) U.S. Cl.
CPC .......... *G06K 7/10009* (2013.01); *G06K 19/067* (2013.01); *H04K 1/00* (2013.01); *G01S 7/021* (2013.01)

(58) Field of Classification Search
CPC ............ G01S 7/41; G01S 7/411; G01S 7/412
See application file for complete search history.

(56) References Cited

U.S. PATENT DOCUMENTS

| 5,389,790 | A | 2/1995 | Honey et al. |
| 7,464,005 | B1 | 12/2008 | Beetner et al. |
| 2011/0095934 | A1 | 4/2011 | Freeman et al. |
| 2012/0226159 | A1 * | 9/2012 | Sinclair et al. ................. 600/443 |

FOREIGN PATENT DOCUMENTS

WO    WO2009035730 A1 *    3/2009    ............. G06F 19/00

OTHER PUBLICATIONS

International Search Report for PCT/IB2013/002094 dated Mar. 25, 2014.
"Detection and Identification of Vehicles Based on Their Unintended Electromagnetic Emissions", IEEE Transactions on Electromagnetic Compatibility, IEEE Service Center, NY, NY; vol. 48; No. 4; pp. 752-759.

* cited by examiner

*Primary Examiner* — Tony Ko
(74) *Attorney, Agent, or Firm* — McCormick, Paulding & Huber LLP (57) ABSTRACT

A system and method for device identification includes a receiver adapted to detect an electromagnetic radiation interference signal emitted by a device and a microprocessor operatively connected to the receiver. The microprocessor may identify at least one device characteristic parameter of the electromagnetic radiation signal. The system includes memory for storing at least one constant or predicted future characteristic value associated with the device and the microprocessor may compare the detected characteristic parameter to the at least one constant or predicted future characteristic value to identify and recognize the device that emitted the electromagnetic radiation signal.

16 Claims, 4 Drawing Sheets

FIG. 1

Time (ms)
FIG. 2

Frequency (Hz)
FIG. 3

ELECTROMAGNETIC INTERFERENCE DEVICE IDENTIFICATION SYSTEM AND METHOD

FIELD OF THE INVENTION

The present invention relates to identification of machines and devices.

BACKGROUND OF THE INVENTION

One approach for identification of machines and devices, including motor vehicles for example, may be based on device properties such as size, shape, color or the like. However, it is difficult to use these properties to distinguish between similar devices for identification purposes since they are not typically unique. For example, shape and color may not be appropriate for distinguishing between two cars that are the same model and color. Additionally, some device properties, such as color, may be readily changed, thereby making identification even more problematic. For example, the color of a motor vehicle can be changed for the express purpose of avoiding identification.

To provide more individualized identification, machines and devices are often assigned attributes or features, such as numbers or labels, to aid in their identification. For example, motor vehicles may be identified based on an identification number, a numbered plate, a numbered sticker or the like. However, these assigned attributes or features are typically not inherent properties of the machine or device and may be removed and/or altered for fraudulent purposes to circumvent identification efforts.

SUMMARY

According to an embodiment, a system for device identification includes a receiver adapted to detect an electromagnetic radiation signal emitted by a device and a microprocessor operatively connected to the receiver. The electromagnetic radiation signal may be an interference signal generated by the device. The microprocessor is adapted to identify at least one characteristic of the electromagnetic radiation signal and to identify the device by comparing the at least one characteristic of the electromagnetic radiation signal to a known value.

According to an embodiment, the microprocessor is adapted to identify the device that emitted the electromagnetic radiation signal by comparing the at least one characteristic parameter of the electromagnetic radiation signal to at least one stored future characteristic value associated with the device.

According to an embodiment, the system includes memory for storing the at least one stored future characteristic value associated with the device.

According to an embodiment, the microprocessor may extract a plurality of characteristic parameters of the electromagnetic radiation signal. The microprocessor may also compare the plurality of characteristic parameters to a plurality of stored future characteristic value.

According to an embodiment, the microprocessor may develop at least one predicted future characteristic value associated with the device during a calibration period. In some embodiments, the microprocessor may extrapolate known values of the characteristic parameter to develop the predicted future characteristic value.

According to an embodiment, the system may recognize and identify the device that emitted the electromagnetic radiation signal if the value of the at least one characteristic parameter is within a certain tolerance range (e.g. 1%) of the at least one stored future characteristic value.

According to an embodiment, the receiver may be adapted to detect a plurality of electromagnetic radiation signals from a plurality of device and the microprocessor may be adapted to identify at least one characteristic parameter of each electromagnetic radiation signal of the plurality of electromagnetic radiation signals. The microprocessor may indentify which device of the plurality of devices emitted the electromagnetic radiation signal by comparing the at least one characteristic parameter of each electromagnetic radiation signal of the plurality of electromagnetic radiation signals to the at least one stored future characteristic value.

According to an embodiment, the system may include an executing module in communication with the microprocessor that is adapted to perform an operation after successful identification and recognition of the device by the microprocessor.

According to an embodiment, the executing module may command an associated system (e.g. a door opener) after successful identification and recognition of the device by the microprocessor.

According to an embodiment, the executing module includes a display adapted to inform about successful recognition and identification of the device by the microprocessor.

According to an embodiment, the executing module may release a charging station after successful recognition and identification of the device by the microprocessor.

According to an embodiment, a system for identification of a device includes a receiver adapted to detect electromagnetic radiation, that may be an interference signal, emitted by the device and a microprocessor operatively connected to the receiver, the microprocessor adapted to extract at least one characteristic pattern from the electromagnetic radiation. The system also includes memory connected to the microprocessor for storing at least one future characteristic pattern associated with the device. The microprocessor is adapted to identify the device by comparing the at least one characteristic pattern of the electromagnetic radiation to the at least one stored future characteristic pattern stored in the memory to determine if the at least one characteristic pattern of the electromagnetic radiation matches the at least one future characteristic pattern stored in the memory.

According to an embodiment, the system also includes an executing module in communication with the microprocessor. The executing module may perform an operation if the microprocessor determines that the at least one characteristic pattern of the electromagnetic radiation matches the at least one future characteristic pattern stored in the memory.

According to an embodiment, the microprocessor may be adapted to identify a plurality of characteristic patterns of the electromagnetic radiation and to compare the plurality of characteristic patterns to a plurality of future characteristic patterns stored in the memory.

According to an embodiment, a method for device identification comprises detecting an electromagnetic radiation signal and identifying at least one characteristic of the electromagnetic radiation signal. The electromagnetic radiation signal may be an interference signal generated by the device. The method further includes indentifying that a device emitted the electromagnetic radiation signal by comparing the at least one detected characteristic of the electromagnetic radiation signal to a known value.

According to an embodiment, the method may also comprise comparing the at least one detected characteristic to at least one stored characteristic associated with the device and identifying that the device emitted the electromagnetic radiation signal if the at least one detected characteristic matches the at least one stored characteristic associated with the device.

According to an embodiment, the method may also include updating the at least one stored characteristic associated with the device if the at least one detected characteristic matches the at least one stored characteristic.

According to an embodiment, the method may also include identifying at least a second characteristic of the electromagnetic radiation signal and comparing the second characteristic to at least a second stored characteristic associated with the device. The method may further include identifying that the device emitted the electromagnetic radiation signal if the at least one detected characteristic matches the at least one stored characteristic and the second detected characteristic matches the second stored characteristic.

According to an embodiment, the method may also include developing the at least one stored predicted future characteristic associated the device during a calibration period by extrapolating known values of a detected characteristic.

These and other embodiments of will become apparent in light of the following detailed description herein, with reference to the accompanying drawings.

DETAILED DESCRIPTION

Figure 1:
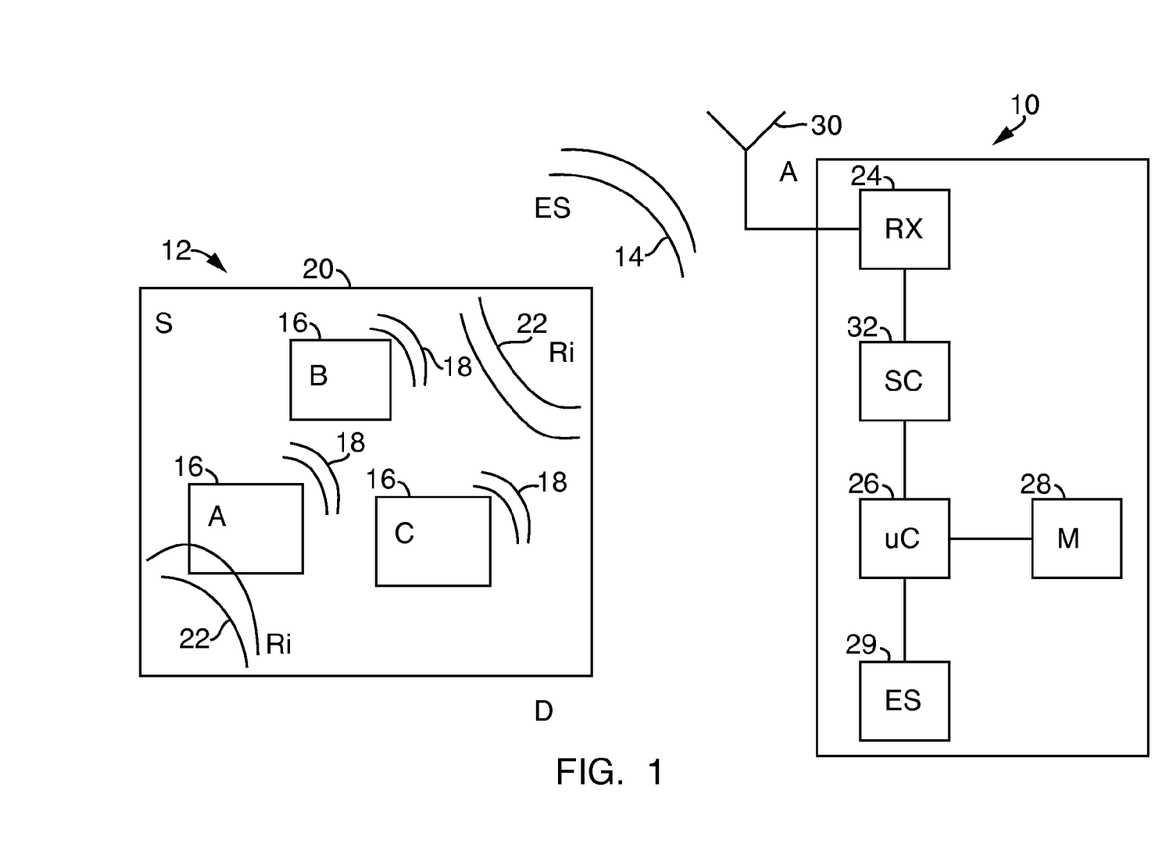
FIG. 1 is a schematic diagram of a system according to an embodiment.

Referring to FIG. 1, a system 10 for identification of a machine or device 12 through an external electromagnetic radiation signal 14 emitted from the device 12 is shown. The external electromagnetic radiation signal 14 is an interference signal generated by the device, rather than a deliberately generated signal, as will be discussed in greater detail below.

The device 12 may have electro-mechanical capabilities, such as a motor vehicle, freight rig, plane or boat, and includes one or more internal subcomponents 16, such as electric motors, power switches or the like. These internal subcomponents 16 provide the device 12 with the electromechanical capabilities. However, like most electro-mechanical components, the internal subcomponents 16 emit electromagnetic radiation 18—i.e., interference, when active, which is typically undesirable because it can cause, among other things, parasitic coupling. The device 12 may include an enclosure or encasement 20 in which the internal subcomponents 16 are located to shield and minimize the amount of the electromagnetic radiation 18 being emitted from the device 12 to the outside of the enclosure or encasement 20. The encasement 20 thereby acts to prevent the electromagnetic radiation 18 from interfering with other external devices (not shown). However, despite the shielding caused by the encasement 20, part of the electromagnetic radiation 18 and its internal reflections 22 are still emitted from the device 12. These emissions, in the form of the external electromagnetic radiation, create signal 14 when the device 12 is activated.

This external electromagnetic radiation signal 14 usually includes a high fraction of random noise plus a much smaller fraction of deterministic patterns that originate from internal functional processes of the one or more internal subcomponents 16. For example, the patterns may include a periodic component that originates from commutator contacts of a conventional electric motor or a fast switching power electronic circuitry. These deterministic patterns are unique to the operation of the specific internal subcomponents 16 and, therefore, are unique to the device 12. Accordingly, the characteristics of the deterministic patterns may be isolated and used for identification of the device 12 by the system 10 as discussed in greater detail below.

Still referring to FIG. 1, the system 10 for identification of the machine or device 12 includes a receiver 24 connected to a microprocessor 26, which is, in turn, connected to memory 28 and to an execution system 29. The receiver 24 may include an antenna 30 and is adapted to detect the external radiation signal 14 emitted by the device 12. The properties of the antenna 30 are dependent upon the expected electromagnetic radiation signal 14 from the device 12 as should be readily understood by one of ordinary skill in the art. For example, in some embodiments, the antenna may have a reception bandwidth of several hundred kilohertz capable of receiving the external radiation signal 14 from the device 12 with poor interference cancellation. In these embodiments, the antenna 30 of the receiver 24 may simply need to be located proximate—e.g., within a range of several meters—to the device 12 to detect the external radiation signal 14. In other embodiments, the receiver 24 may be positioned in a line-of-sight with the device 12 and may implement known techniques for interference cancellation along with a directed antenna 30 to minimize any influence of the external environment—e.g., detrimental effects of system external signal interference.

The receiver 24 receives and relays the electromagnetic radiation signal 14, or a signal derived therefrom, to the microprocessor 26. Microprocessor 26 may include computer readable code for analyzing the external radiation signal 14 to identify at least one characteristic pattern of the external radiation signal 14, which is representative of a unique characteristic of the device 12 and, therefore, may be used to identify the device 12. The microprocessor 26 is able to use the at least one characteristic pattern for identification of the device 12, as will be discussed in greater detail below.

In some embodiments, the system 10 may also include a signal conditioner 32 positioned between the receiver 24 and the microprocessor 26. As discussed above, the external radiation signal 14 includes random noise plus deterministic patterns that originate from internal functional processes of the one or more internal subcomponents 16. The signal conditioner 32 may demodulate and/or filter the noise from the signal. For example, in some embodiments, the signal conditioner 32 may filter the signal by applying a band pass around a particular frequency of interest that defines a characteristic pattern of the external radiation signal 14. The signal conditioner 32 may also amplify the demodulated and filtered signal and/or execute an analog to digital conversion prior to processing at the microprocessor 26.

Figure 2:
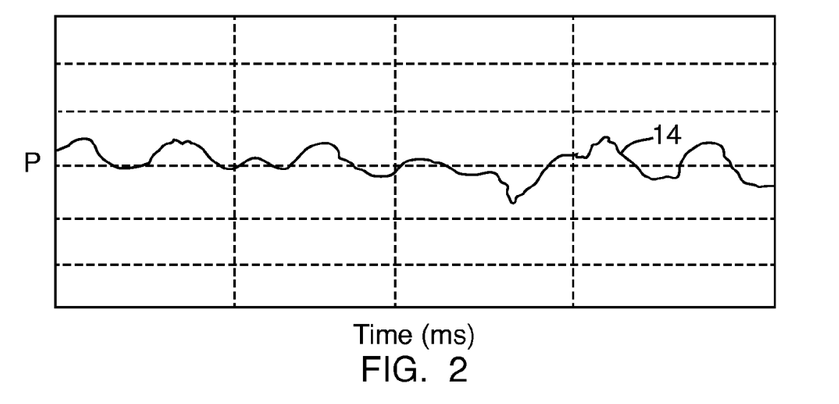
FIG. 2 is a graphical representation of an exemplary external radiation signal according to an embodiment.
Figure 3:
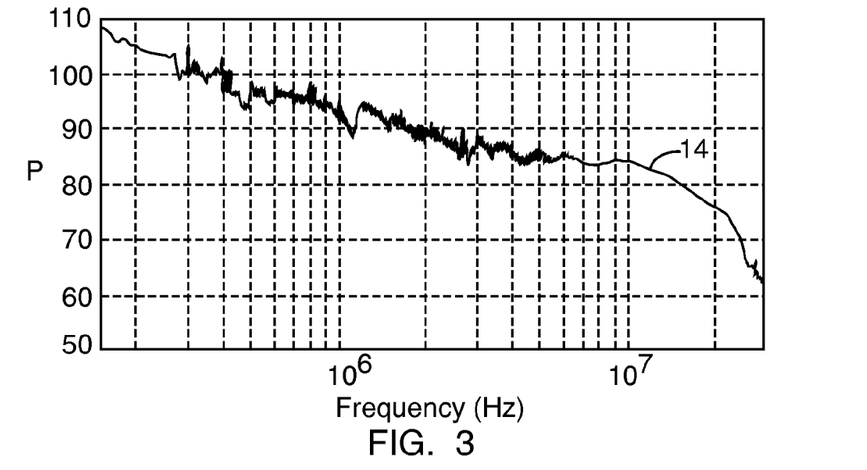
FIG. 3 is a graphical representation of an exemplary external radiation signal according to an embodiment.

Referring to FIG. 2 and FIG. 3, exemplary embodiments of external radiation signal 14 are shown in the time domain and frequency domain, respectively, after signal conditioning and preprocessing by signal conditioner 32, shown in FIG. 1. Although shown without signal demodulation, in some embodiments, where the external radiation signal 14 is modulated, the signal conditioner 32, shown in FIG. 1, may also demodulate the external radiation signal 14 prior to processing by the microprocessor 26, shown in FIG. 1, as discussed above. The microprocessor 26, shown in FIG. 1, may analyze a received radio frequency power P, defined as:

$$P = \frac{V(t)^2}{Z}$$

Where:
V(t) is a voltage of the external radiation signal as a function of time; and
Z is impedance.

In the time domain, shown in FIG. 2, the microprocessor 26, shown in FIG. 1, may extract and analyze characteristic parameters of the received radio frequency power P of the external radiation signal 14 to derive information about characteristic pulse sequences of the received radio frequency power such as pulse shape, duty cycle and pulse frequency, as well as the first and/or second derivatives of these quantities.

The microprocessor 26, shown in FIG. 1, may also convert the received radio frequency power P to frequency domain, shown in FIG. 3—e.g., through Fourier transformation, and then analyze frequency distributions or use spectral analysis to derive spectral information about characteristic frequencies of the external radiation signal 14 and their amplitudes for use as characteristic parameters for device identification.

As discussed above, the external radiation signal 14 includes deterministic patterns that originate from internal functional processes of the one or more internal subcomponents 16, shown in FIG. 1. These deterministic patterns affect the received radio frequency power P detected by the system 10, shown in FIG. 1, and define the behavior of the characteristics discussed above that are detected by the system 10, shown in FIG. 1. For instance, the deterministic pattern may provide the received radio frequency power P with a particular pulse frequency, pulse shape and/or duty cycle in the time domain and/or distinct characteristic frequencies and amplitudes in the frequency domain that are different from those that would be emitted by a different device since they result from individual or inherent device properties such as oscillations originating from varying contact resistance due to scratches on electric motor collector contacts, specific dimensions of characteristic power switching circuit components or the like. Thus, these detected characteristics may be used as a signature to identify the device 12 since the deterministic patterns originating from the internal functional processes of the one or more internal subcomponents 16, shown in FIG. 1, are distinct to the device 12, shown in FIG. 1.

Figure 4:
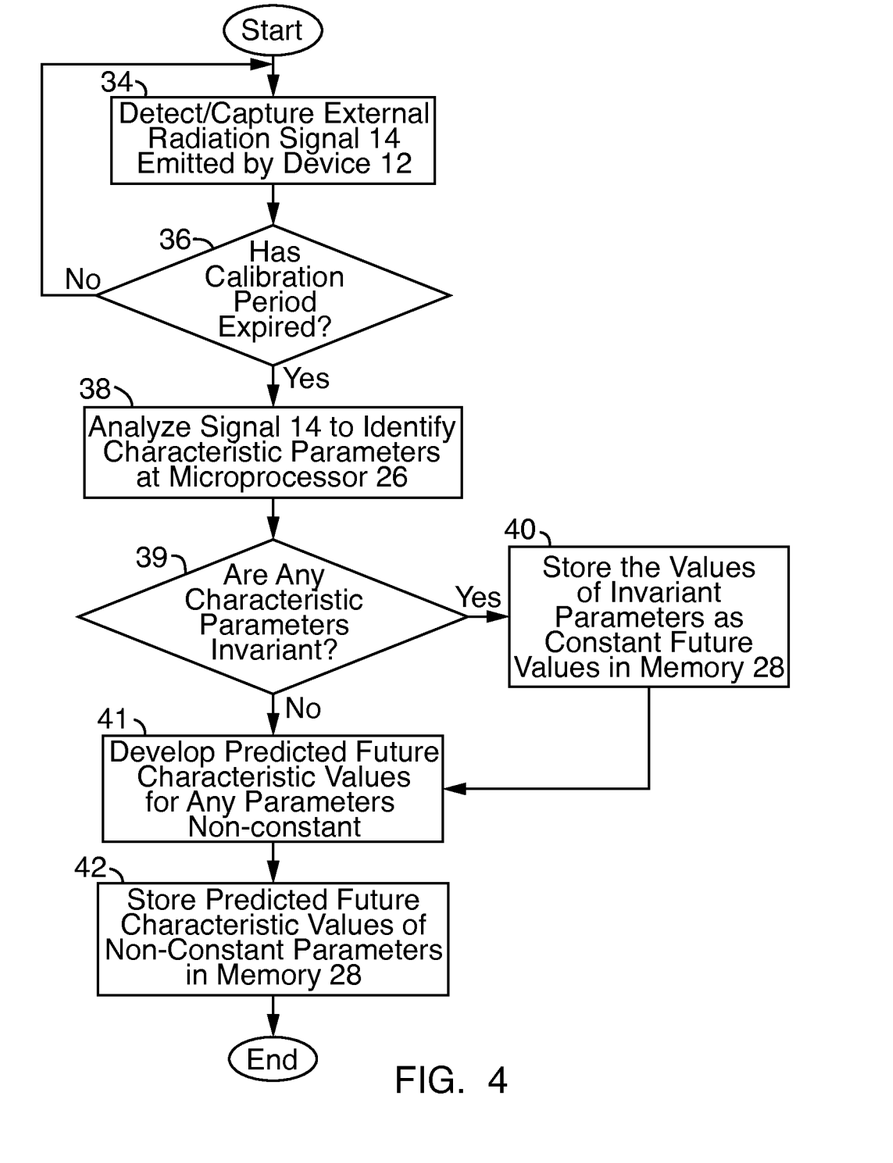
FIG. 4 is a flow diagram of an embodiment for calibration of the system of FIG. 1.

Referring to FIG. 4, to provide for identification of the device 12 through the external radiation signal 14, the system 10, shown in FIG. 1, must first be calibrated to the device 12. To become calibrated, the system 10, shown in FIG. 1, detects and captures the external radiation signal 14 at 34 until a calibration period has expired at 36. The microprocessor 26 analyzes the received external radiation signal 14 and, in particular, one or more of the characteristics discussed above over the calibration time period at 38 to observe changes in the detected values of the characteristics as a function of elapsed time. For example, with ongoing wear of the subcomponents 16, shown in FIG. 1, as the device 12 operates, the values of some of the characteristic parameters may change gradually over time. When analyzing the characteristics, the microprocessor 26 first determines which characteristics are appropriate for device identification by identifying those characteristics that have a stationary—e.g., invariant, or a deterministic aging pattern so that future values of the characteristic may be predicted based on the known behavior observed during the calibration time period. For example, the microprocessor 26 may analyze the external radiation signal 14 using known mathematical procedures like correlation analysis and Bayesian algorithms, or the like, to extract characteristic patterns and may use exemplary methods including regression analysis to determine how each characteristic parameter varies over time to provide a number of specific values for each characteristic parameter that models that characteristic parameter's behavior over the calibration period. Since the behavior of the characteristic parameters is, at least in part, due to the internal subcomponents 16, shown in FIG. 1, of the device 12, the specific values identified in the analysis are indirectly related to individual component properties of the device 12.

For example, in some embodiments, the individual device properties—e.g., oscillations originating from varying contact resistance due to scratches on the electric motor collector contacts or specific dimensions of characteristic power switching circuit components—may cause variation(s) in the received radio frequency power P, which will change the frequency distributions of the electromagnetic radiation signal 14. The microprocessor 26 may perform a correlation analysis of the frequency distributions detected during the calibration period to extract the characteristic signal parameters from the electromagnetic radiation signal 14 that correlate to the frequency distributions of the received radio frequency power P received during the calibration period. Thus, the correlation analysis may result in characteristic parameters that model the frequency distributions of the received radio frequency power P and, therefore, model the external radiation signal 14 of the device 12. As should be understood by those skilled in the art, the various mathematical procedures discussed above may be implemented by the microprocessor 26 for modeling the behavior of the electromagnetic radiation signal 14 of the device 12 to develop the characteristic parameters. Preferably, the microprocessor 26 develops specific values to model a variety of the characteristics of the external radiation signal 14 discussed above in both the time domain and the frequency domain over the calibration period.

Once the microprocessor 26 has developed the specific values to model the characteristics of the external radiation signal 14 over the calibration period, the microprocessor 26 determines if any of the identified characteristic parameters are invariant (i.e. stationary or constant) at 39. If any of the identified characteristic parameters are invariant, the microprocessor 26 stores the specific values of these invariant characteristic parameters as constant future values in memory 28 at 40 since it may not be necessary to analyze the wear characteristics of these constant parameters. It should be understood by those skilled in the art that characteristic parameters that exhibit a slight or very gradual aging pattern over time may still be viewed, analyzed and modeled by the microprocessor 26 as invariant parameters, if desired. Analyzed and modeled characteristic parameters that exhibit gradual aging patterns may be particularly advantageous if the system 10, shown in FIG. 1, allows for future updates to the stored values as will be discussed in greater detail below since doing so might reduce the time and computing power required to model the external radiation signal 14.

At 41, the microprocessor 26 then develops predicted future values of each non-constant characteristic parameter, where appropriate. In particular, as discussed above, some characteristic parameters of the device 12 may change gradually with age due to wear or the like of the internal subcomponents 16, shown in FIG. 1. Therefore, at 41, the microprocessor 26 analyzes these non-constant characteristics parameters to develop aging predictions for the characteristic parameters and the specific values thereof. For example, the aging predictions may be based on the regression analysis discussed above, simple extrapolations over time or with time series analysis such as autoregressive moving average, autoregressive integrated moving average, the Holt-Winters method or the like, depending upon any aging observed over the calibration period. The microprocessor 26 then stores the specific values of the non-constant, yet deterministic, characteristic parameters and the aging predictions in memory 28 as predicted future characteristic values at 42 to complete calibration.

Figure 5:
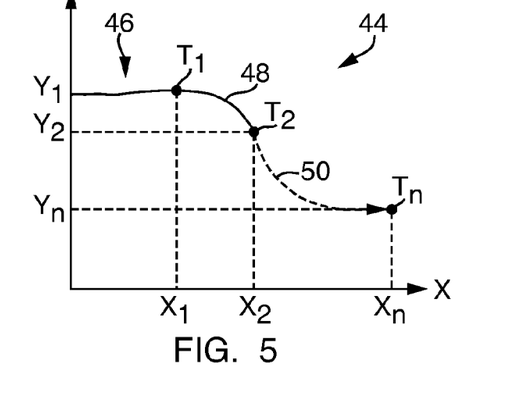
FIG. 5 is a constellation diagram of an embodiment for parameter storage and prediction in the system of FIGS. 1.

Referring to FIG. 5, an exemplary constellation diagram 44 shows how the microprocessor 26, shown in FIG. 1, may store the values and predictions for two characteristic parameters X and Y of the electromagnetic radiation signal 14, shown in FIGS. 2 and 3, in memory 28, shown in FIG. 1. The characteristic parameters X and Y may be independent of one another and may be any of the various characteristic parameters discussed above (e.g. the pulse frequency, pulse shape and/or duty cycle in the time domain and/or the characteristic frequencies and amplitudes in the frequency domain) and, although shown with only two parameters for simplicity, it should be understood by those skilled in the art that the number of characteristic parameters having values and predictions stored in memory 28, shown in FIG. 1, may be much higher. The constellation diagram 44 visually represents the changes in the variety of characteristic parameters X, Y, etc. over time. In the constellation diagram 44, a track 46 may connect the parameters X and Y at a variety of time points, with a trajectory, slope and curvature of the track 46 depending upon the changes of all of the mapped characteristic parameters X, Y, etc. over time. The track 46 includes a known portion 48 and a predictive portion 50 that illustrate how the parameters X and Y change over time. The known portion 48 may be, for example, the calibration period discussed above and includes measured values $X_1$ and $Y_1$ for parameters X and Y, respectively, at time $T_1$ and measured values $X_2$ and $Y_2$ for parameters X and Y, respectively, at time $T_2$. Although only two known points (i.e. $X_1/Y_1$ and $X_2/Y_2$) are shown in the known portion 48 for simplicity, it should be understood by those skilled in the art that many more points would likely be necessary to provide a reliable interpolation to properly forecast the behavior of the track 46. The predictive portion 50 may be an extrapolation of the known portion 48, as discussed above, and illustrates the predicted values $X_n$ and $Y_n$ for parameters X and Y, respectively at time $T_n$. The track 46 shows the changes to parameters X and Y reasoned by wear out or the like. As seen in the constellation diagram 44, the attributes of the track 46 (e.g. slope and curvature) also change slowly over time and, therefore, these attributes, as well as the first derivatives thereof, may also be characteristics used to identify the device 12, shown in FIG. 1.

Figure 6:
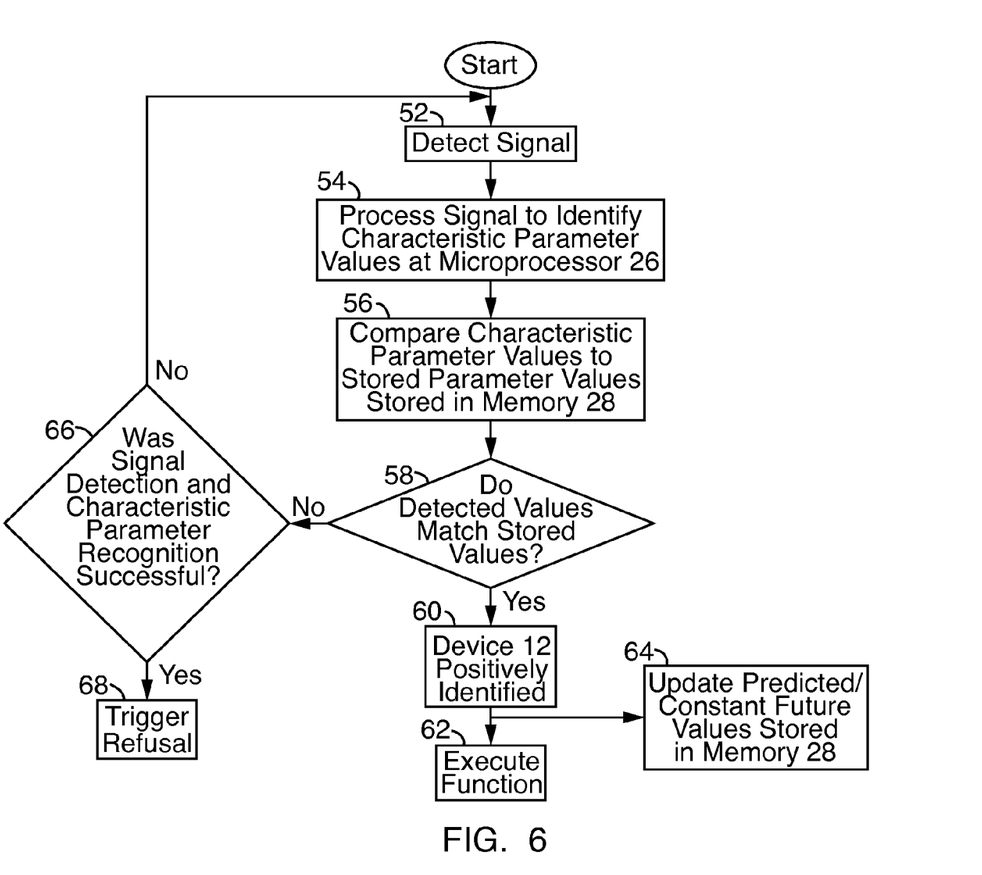
FIG. 6 is a flow diagram of an embodiment for device detection according to the system of FIG. 1.

Referring to FIG. 6, in operation, the system 10, shown in FIG. 1, may use the stored characteristics values and predictions to identify the device 12. For example, the system 10, shown in FIG. 1, detects the external radiation signal 14 when the device 12 is in range of the receiver 24, shown in FIG. 1, at 52 and relays the external radiation signal 14 to the microprocessor 26. At 54, the microprocessor 26 receives the external radiation signal 14 from the receiver 24, shown in FIG. 1—or from the conditioner 32, shown in FIG. 1, if signal conditioning is implemented—and analyzes one or more characteristic parameters of the external radiation signal 14 for device identification purposes. In particular, the microprocessor 26 analyzes the same characteristic parameters selected during calibration, in substantially the same manner, to provide detected values for each characteristic parameter. Once the microprocessor 26 has determined the detected values for each characteristic parameter of concern, the microprocessor 26 compares the detected values to the predicted future values stored in memory 28 at 56. If the microprocessor 26 determines that the values match the predicted future values stored in memory 28 at 58, the microprocessor 26 positively identifies the device 12 at 60. If the microprocessor 26 determines that the values do not match the predicted future values stored in memory 28 at 58, the microprocessor 26 does not positively identify the device 12.

In some embodiments, the microprocessor 26 may determine that detected values match the predicted future values at 58 if the detected values are within a defined ranged about the predicted future values for each characteristic parameter. For example, in some embodiments, detected values within 1% of the predicted future values may be deemed a match by the microprocessor 26. In other embodiments, detected values within 5% or 10% of the predicted future values may be deemed a match by the microprocessor 26, depending upon an intended application of the system 10, shown in FIG. 1. Additionally, the system 10, shown in FIG. 1, may use a combination of several characteristics parameters when identifying the device 12 since the more independent characteristic parameters used for device identification, the less likely that there will be any device confusion or misidentification.

Still referring to FIG. 6, if the microprocessor 26 positively identifies the device 12 at 60, the microprocessor 26 may command the executing module 29, shown in FIG. 1, to perform an intended function at 62. The executing module 29, shown in FIG. 1, may, for example, simply include a display for displaying the characteristic parameters and values of the device 12 or for informing successful identification of the device 12 by the microprocessor 26. In some embodiments, the executing module 29, shown in FIG. 1, may conduct a suited operational measure such as commanding an electronic or electromechanical system to perform an operation such as opening a garage door for a vehicle (e.g. when the device 12 is the vehicle), releasing a charging station after successful device authentication procedure, or conducting other similar activities that require prior authentication and authorization.

In some embodiments, if the microprocessor 26 positively identifies the device 12 at 60, the microprocessor 26 may also update the predicted future parameter values, including aging characteristics, stored in memory 28 at 64. This may ensure that the system 10, shown in FIG. 1, is more accurately modeling and predicting the characteristic parameters for future device identification and may be particularly advantageous where detected values within a particular range about the predicted future values are deemed a match to account for variations between the detected values and the predicted values.

If the microprocessor 26 determines that the values do not match the predicted future values stored in memory 28 at 58—e.g., the microprocessor 26 does not positively identify the device 12, at 66—the microprocessor may then evaluate whether or not the system 10, shown in FIG. 1, properly detected the external radiation signal 14 at 52 and whether or not the microprocessor 26 properly identified and extracted the characteristic parameters at 54. For example, the microprocessor 26 may evaluate whether the external radiation signal 14 was not detected or was too weak and/or included too much noise to identify and extract the characteristic parameters. If the microprocessor 26 determines that signal detection and/or characteristic parameter recognition was unsuccessful at 66, the system 10, shown in FIG. 1, may restart the process and attempt to receive a meaningful signal. Alternatively, if the microprocessor 26 does not positively identify the device 12 at 58 and determines that signal detection and characteristic parameter recognition were successful at 66, the microprocessor may trigger a refusal system at 68. The refusal system may include, for example, displaying an "access denied" message, triggering an alarm, illuminating a light or any similar desired system for indicating that the device 12 was not recognized by the system 10, shown in FIG. 1.

The system 10, shown in FIG. 1, may be a passive procedure that requires no effort from the device 12 and, therefore, might be essentially imperceptible to the device 12. Additionally, since the system 10, shown in FIG. 1, relies entirely on unique properties of the device 12, the system 10, shown in FIG. 1, minimizes the chance of misidentification or device confusion.

The system 10, shown in FIG. 1, for device identification may not need to rely on any additional identification add-ons or assigned attributes such as tags, plates, stickers, numbers or the like, which makes it far more difficult for someone to alter and/or remove the device's identification credentials for fraudulent purposes. Additionally, the elimination of assigned identification attributes may makes the system 10, shown in FIG. 1, especially suited for anonymous re-identification—e.g., for use by police or when device ownership changes hands.

In some embodiments, the system 10, shown in FIG. 1, may compare subsets of the stored characteristic parameters, rather than comparing the complete parameter set stored in memory 28, shown in FIG. 1, in order to address device tampering in an attempt to alter the fingerprint or properties of the external radiation signal 14, shown in FIG. 1. For example, a thief may attempt to change the external radiation signal 14, shown in FIG. 1, of a stolen car by replacing some of the subcomponents 16, shown in FIG. 1. Therefore, to overcome this device tampering, the system 10, shown in FIG. 1, may be set to compare subsets of the stored characteristic parameters for the vehicle in order to identify the stolen vehicle, or to at least narrow the search for the stolen vehicle, even though the external radiation signal 14, shown in FIG. 1, may have been altered slightly.

Although this invention has been shown and described with respect to the detailed embodiments thereof, it will be understood by those skilled in the art that various changes in form and detail thereof may be made without departing from the spirit and the scope of the invention. For instance, although the system has been described as extracting characteristic parameters from radio frequency electromagnetic radiation emitted by devices for device identification, it should by understood by those skilled in the art that the system, without the antenna, may also be connected to a power grid for extracting conducted electromagnetic radiation directly from a power grid for identification of devices connected thereto. Additionally, it should be understood by those skilled in the art that the system may be implemented for acoustic identification using acoustic signals, e.g. to identify a vehicle by the sound it makes, by replacing the antenna with a microphone.

What is claimed is:

1. A system for identifying a device, the system comprising:
    a receiver adapted to detect an electromagnetic radiation signal emitted by the device; and
    a microprocessor operatively connected to the receiver, the microprocessor adapted to identify at least one characteristic of the electromagnetic radiation signal and to identify the device that emitted the electromagnetic radiation signal by comparing the at least one characteristic of the electromagnetic radiation signal to a stored future characteristic value associated with the device;
    wherein the stored future characteristic value includes at least one predicted future characteristic value associated with the device; and
    wherein the microprocessor is adapted to develop the at least one predicted future characteristic value during a calibration period in which the microprocessor extrapolates known values of the characteristic parameter to develop the predicted future characteristic value.

2. The system according to claim 1, further comprising memory connected to the microprocessor for storing the stored future characteristic value associated with the device.

3. The system according to claim 1, where in the microprocessor identifies the device that emitted the electromagnetic radiation signal if the value of the at least one characteristic parameter is within a 1% of the stored future characteristic value.

4. The system according to claim 1, wherein the receiver is adapted to detect a plurality of electromagnetic radiation signals from a plurality of device; and
    wherein the microprocessor is adapted to identify at least one characteristic parameter of each electromagnetic radiation signal of the plurality of electromagnetic radiation signals and to identify which device of the plurality of devices emitted the electromagnetic radiation signal by comparing the at least one characteristic parameter of each electromagnetic radiation signal of the plurality of electromagnetic radiation signals to the stored future characteristic value.

5. The system according to claim 1, further comprising an executing module in communication with the microprocessor and adapted to perform an operation if the microprocessor identifies that the device emitted the electromagnetic radiation signal.

6. The system according to claim 5, wherein the executing module commands an associated system to open a door if the microprocessor identifies the device successfully.

7. The system according to claim 5, wherein the executing module includes a display adapted to display successful identification of the device by the microprocessor.

8. The system according to claim 5, wherein the executing module releases a charging station if the microprocessor identifies the device successfully.

9. The system according to claim 1, wherein the microprocessor is adapted to extract a plurality of characteristic parameters from the electromagnetic radiation signal and to compare the plurality of characteristic parameters to a plurality of stored future characteristic value.

10. A system for identification of a device emitting electromagnetic radiation comprising:
    a receiver adapted to detect the electromagnetic radiation emitted by the device;
    a microprocessor operatively connected to the receiver, the microprocessor adapted to extract at least one characteristic pattern from the electromagnetic radiation; and
    memory connected to the microprocessor for storing at least one future characteristic pattern associated with the device;
    wherein the microprocessor is adapted to identify the device by comparing the at least one characteristic pattern of the electromagnetic radiation to the at least one stored future characteristic pattern in the memory to determine if the at least one characteristic pattern of the electromagnetic radiation matches the at least one future characteristic pattern stored in the memory;

wherein the at least one stored future characteristic pattern includes at least one predicted future characteristic pattern associated with the device; and wherein the microprocessor is adapted to develop the at least one predicted future characteristic pattern during a calibration period in which the microprocessor extrapolates known values of the characteristic pattern to develop the predicted future characteristic pattern.

11. The system according to claim 10, further comprising an executing module in communication with the microprocessor and adapted to perform an operation if the microprocessor determines that the at least one characteristic pattern of the electromagnetic radiation matches the at least one future characteristic pattern stored in the memory.

12. The system according to claim 10, wherein the microprocessor is adapted to identify a plurality of characteristic patterns of the electromagnetic radiation and to compare the plurality of characteristic patterns to a plurality of future characteristic patterns stored in the memory.

13. A method for device identification comprising:
    detecting an electromagnetic radiation signal;
    identifying at least one characteristic of the electromagnetic radiation signal;
    developing at least one stored predicted future characteristic associated with the device during a calibration period by extrapolating known values of the at least one identified characteristic; and
    identifying that a device emitted the electromagnetic radiation signal by comparing the at least one detected characteristic of the electromagnetic radiation signal to the at least one stored predicted future characteristic.

14. The method according to claim 13, additionally comprising:
    identifying that the device emitted the electromagnetic radiation signal if the at least one detected characteristic matches the at least one stored predicted future characteristic associated with the device.

15. The method according to claim 14, additionally comprising:
    updating the at least one stored predicted future characteristic associated with the device if the at least one detected characteristic matches the at least one stored predicted future characteristic.

16. The method according to claim 14, additionally comprising:
    identifying at least a second characteristic of the electromagnetic radiation signal; and
    comparing the second characteristic to at least a second stored characteristic associated with the device; and
    identifying that the device emitted the electromagnetic radiation signal if the at least one detected characteristic matches the at least one stored predicted future characteristic and the second detected characteristic matches the second stored characteristic.

* * * * *